(12) United States Patent
Oouchi et al.

(10) Patent No.: US 7,626,934 B2
(45) Date of Patent: Dec. 1, 2009

(54) PACKET TRANSFER APPARATUS

(75) Inventors: Ken Oouchi, Yokohama (JP); Takatoshi Kajiwara, Yokohama (JP); Hiroaki Miyata, Yokohama (JP); Masanori Kamata, Yokohama (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 601 days.

(21) Appl. No.: 11/295,666

(22) Filed: Dec. 7, 2005

(65) Prior Publication Data
US 2006/0146818 A1 Jul. 6, 2006

(30) Foreign Application Priority Data
Dec. 8, 2004 (JP) ............................. 2004-354843
Nov. 25, 2005 (JP) ............................. 2005-339605

(51) Int. Cl.
*H04L 12/26* (2006.01)
(52) U.S. Cl. ...................................... 370/235; 370/230
(58) Field of Classification Search ................. 370/252, 370/216, 401, 229–230.1, 235, 236, 389, 370/400, 402, 410, 464–467; 709/220
See application file for complete search history.

(56) References Cited

U.S. PATENT DOCUMENTS 6,711,162 B1 * 3/2004 Ortega et al. ................. 370/389
7,031,263 B1 * 4/2006 Sun et al. ..................... 370/252
7,080,132 B2 * 7/2006 Cheshire ...................... 709/220
2003/0041151 A1 * 2/2003 Senapati et al. .............. 709/229
2003/0137985 A1 * 7/2003 Koyanagi et al. ............ 370/401
2004/0052263 A1 * 3/2004 Xu ............................... 370/399
2005/0033853 A1 * 2/2005 Jones et al. ................... 709/230

OTHER PUBLICATIONS

Network Working Group Request for Comments: 2516 Category: Informational, by L. Mamakos, et al., "A Method for Transmitting PPP Over Ethernet (PPPoE)". RFC 2516, Feb. 1999. pp. 1-17.

* cited by examiner

*Primary Examiner*—Kwang B Yao
*Assistant Examiner*—Andrew Lai
(74) *Attorney, Agent, or Firm*—Brundidge & Stanger, P.C.

(57) ABSTRACT

A packet transfer apparatus has a controller for controlling transmission of a PADO packet on the basis of the information that is previously set in the packet transfer apparatus in order that the PADO packet can be transmitted back to the terminals or a PADI can be discarded when the PADI packet sent from the terminals to the packet transfer apparatus does not have any Service-Name specified. In addition, another controller is used. This controller is provided so that, when a Service-Name that indicates the type of an offered communication service is specified in the PADI packet, it can judge whether the Service-Name is previously registered in a memory and decide to transmit the PADO packet to the terminal if the Service-Name is previously registered, but to discard the PADI packet if the Service-Name is not registered.

10 Claims, 14 Drawing Sheets

FIG. 4
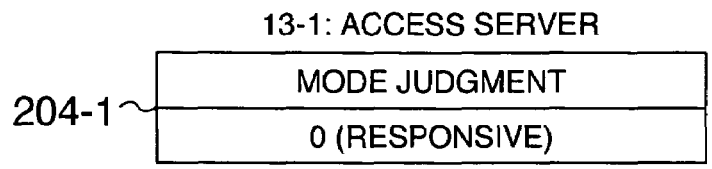
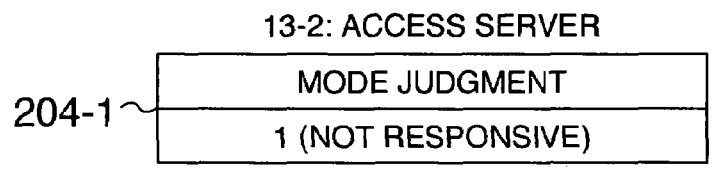
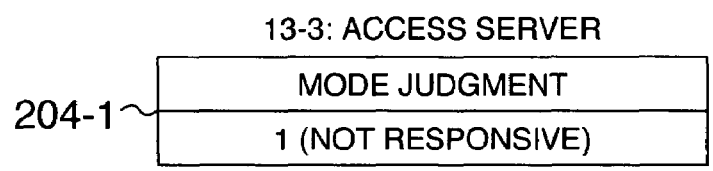
FIG. 5
| INTERFACE | SET Service-Name |
|---|---|
| 0/0 | web |
13-1: ACCESS SERVER (204-2)
| INTERFACE | SET Service-Name |
|---|---|
| 0/0 | VoIP |
13-2: ACCESS SERVER (204-2)
| INTERFACE | SET Service-Name |
|---|---|
| 0/0 | video |
13-3: ACCESS SERVER (204-2)

| SESSION ID (700) | TRANSMISSION SOURCE MAC ADDRESS (701) | JUDGMENT BIT (702) |
|---|---|---|
| 1 | 00:00:00:01 | 1 |
| 2 | 00:00:01:01 | 1 |
| 3 | (00:00:02:01) | 0 |
| ⋮ | ⋮ | ⋮ |
| 100 | (10:00:00:00) | 0 |

| TRANSMISSION SOURCE MAC ADDRESS (1100) | CONNECTION DESTINATION COMMUNICATION NETWORK (1101) |
|---|---|
| 00:00:00:01 | INTERNET |
| 00:00:01:01 | VoIP NETWORK |
| 00:00:02:01 | MULTICAST NETWORK |
| ⋮ | ⋮ |
| NOT REGISTERED | INTERNET |

| SESSION ID POOL (1200) | CONNECTION DESTINATION COMMUNICATION NETWORK (1201) |
|---|---|
| 1-100 | INTERNET |
| 101-200 | VoIP NETWORK |
| 201-300 | MULTICAST NETWORK |
| ⋮ | ⋮ |

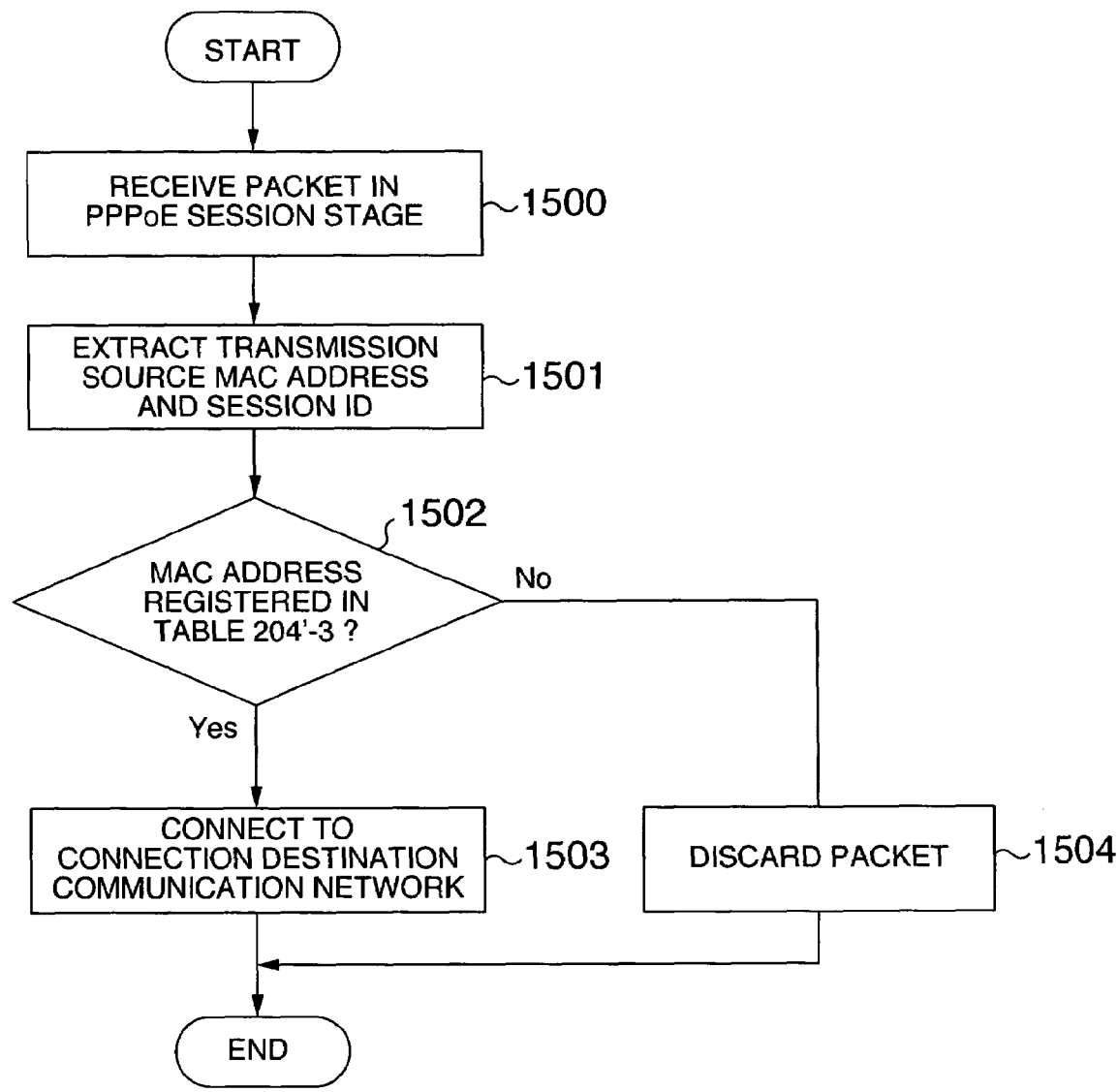

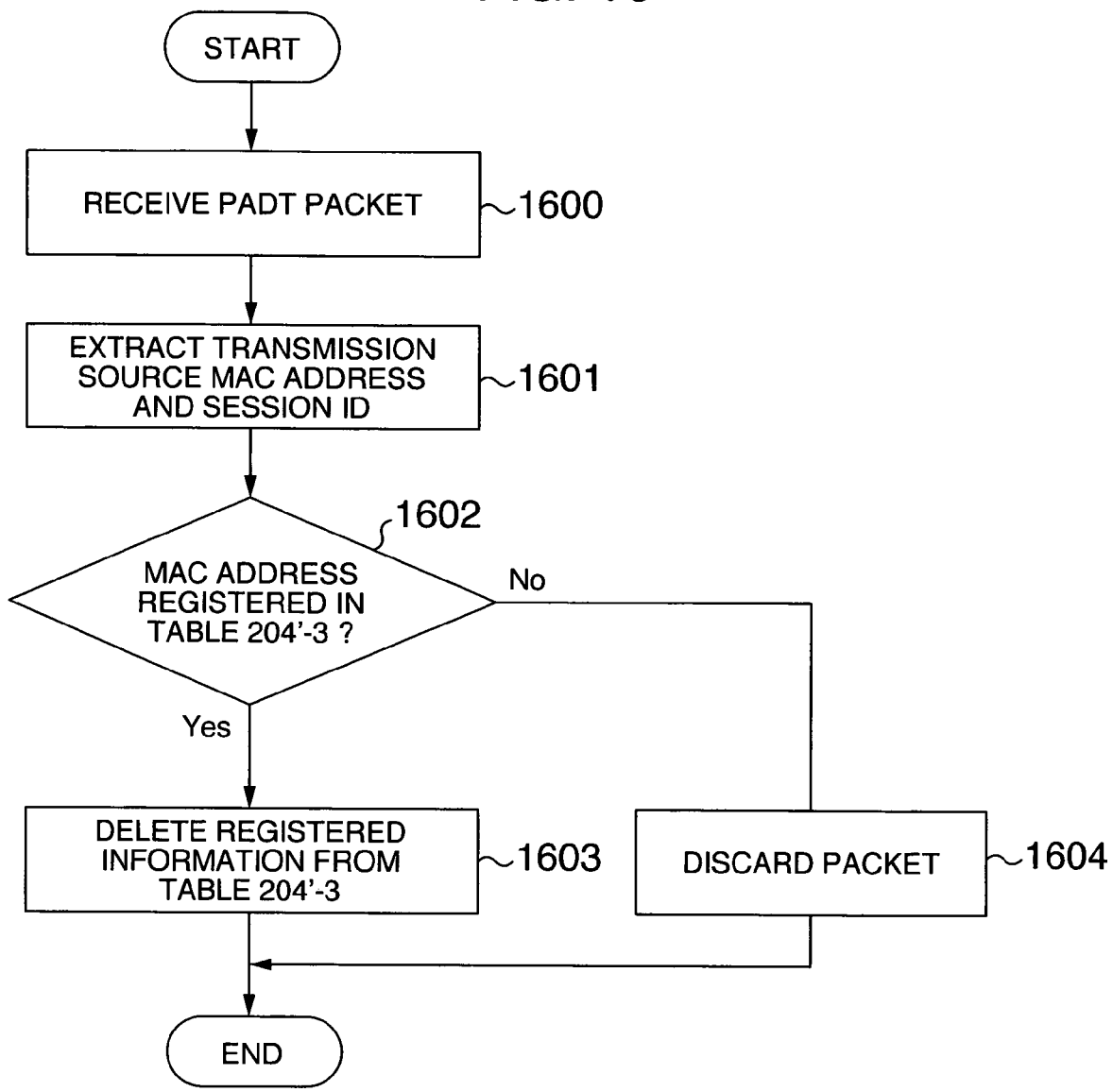

PACKET TRANSFER APPARATUS

INCORPORATION BY REFERENCE

The present application claims priorities from Japanese applications JP2004-354843 filed on Dec. 8, 2004, JP2005-339605 filed on Nov. 25, 2005, the contents of which are hereby incorporated by reference into this application.

BACKGROUND OF THE INVENTION

The present invention relates to a packet transfer apparatus for connecting terminals to destination communication networks by using PPPoE (Point to Point Protocol over Ethernet) (Ethernet is a registered trademark).

The communication networks (IP networks) using IP (Internet Protocol) have become widely used, and created various communication services such as Web access (the so-called Internet), file transfer (data transfer), VoIP (IP phone) and multicast (broadcast). In a communication system widely employed for offering these communication services, packet transfer apparatuses that properly process the received IP packets (hereinafter, occasionally simply called the packets) to be suited for communication and transfer them are provided between a network (the so-called access network provided by a carrier) that holds the ends of user's terminals that enjoy the communication services and other networks (the networks managed/provided by service providers or carriers to run communication services, respectively) that offers the communication services so that the packets from the terminals can be transferred through the packet transfer apparatuses to the facilities (servers) of the communication service providers.

In the access network provided between the user terminals and the packet transfer apparatuses, PPPoE is generally employed to assure the safety (security) and reliability of the packets to be transmitted and received. That is, according to PPPoE, a PPP session is established by using a protocol called PPP on Ethernet (a registered trade name, and hereinafter the same) that is defined in PFC2516 of IETF, and then packets are distributed (transferred).

This PPPoE is used to establish a PPP session on the Ethernet (in the access network) between the packet transfer apparatus and the user terminals so that the packets can be transferred as if they were transferred on exclusive lines. The sequence using the protocol for the transfer of packets is started with the broadcast transmission of a start packet called PADI (The PPPoE Active Discovery Initiation) from a terminal toward the packet transfer apparatuses in order to search for a packet transfer apparatus that could accept a desired communication service. The packet transfer apparatus that can accept the requested communication service (or can transfer the packet to the corresponding communication service provider) transmits a PADO (The PPPoE Active Discovery Offer) packet back to this terminal. Then, this terminal transmits a PADR (The PPPoE Active Discovery Request) packet for requesting to start a PPP session back to the specified packet transfer apparatus. The corresponding packet transfer apparatus allocates a unique session ID to the terminal, and sends a confirmation packet called PADS (The PPPoE Active Discovery Session-Confirmation) back to the terminal. In this case, the session ID is included in the PADS sent from the packet transfer apparatus, and used for the packet transfer apparatus to identify the terminal that has received the PADS. After the establishment of PPP session, the packet transfer using PPP is performed by using this session ID.

According to RFC2516, the terminals side can specify within the PADI packet the Service-Name that indicates the type of the requested communication service and the TAG length that indicates the length of the Service-Name. Examples of the Service-Name are Web access (Internet) and IP (IP phone). In the current RFC2516, however, when the Service-Name is not specified in the parameter of PADI packet, the TAG length of the Service-Name is regarded as 0. In addition, the PADI packet in which the TAG length of the Service-Name is 0 can be accepted by any network service such as the Internet (the PADO packet is transmitted back).

SUMMARY OF THE INVENTION

Under the situations in which various different communication services become widely used as described above, many packet transfer apparatuses are provided in the communication system in order to connect to the networks that offer services such as the Internet and VoIP. Therefore, the construction and operation according to the current PFC2516 cannot cope with the situation that all the apparatuses within the communication system tend to transmit PADO packets to a terminal when they have received the PADI packet with a Service-Name TAG length of 0 broadcasted from the terminal. The terminal must select any one of all the packet transfer apparatuses that have transmitted the PADO packets. If the terminal improperly selects a packet transfer apparatus, the PPP session establishing operation makes progress between the terminal and the PADO packet transmission source packet transfer apparatus, causing such a situation as to be unintended by the maintenance operator of the packet transfer apparatus and the terminal user. That is, the terminal could be connected to the unintended communication equipment of the network that offers a communication service. If this situation occurred, the information that is not intended by the terminal and the service provider might be transmitted and received within the communication system. In addition, such connection is useless connection as they say, and causes the packet transfer apparatus to make unnecessary control operation such as the establishment of PPP session, resulting in reducing the processing ability of the packet transfer apparatus and fruitlessly using the resources of the communication networks.

The standard also defines that if the Service-Name specified in the PADI packet coincides with that set in the packet transfer apparatus, the PADO packet shall be transmitted back to the terminal, but if it does not coincide, the PADI packet shall be discarded. However, the PADO packet is unconditionally transmitted even when the PADI packet does not have any Service-Name specified as described above. Therefore, when the communication system has a mixture of the terminals that send their Service-Names specified and not, the packet transfer apparatus cannot surely connect the network for offering a communication service to the terminals using only the Service-Name, thus causing the problem mentioned above.

In addition, if the packet transfer apparatuses that hold the ends of a plurality of networks for offering communication services perform a connection (distribution) control between any one of the networks and the terminal under the condition that the same Service-Name (VoIP or Internet) is set in the packet transfer apparatuses, an unintended network could be connected to the terminal by using only the Service-Name-based connection (distribution) control for the connection of terminals to the communication networks held on the output ends of the packet transfer apparatuses, thus causing the same phenomenon.

Thus, in view of the above problem, it is an objective of the invention to provide a packet transfer apparatus capable of surely connecting a terminal to a communication network desired by the terminal in a communication system for making communications using PPPoE. That is, the objective of the invention is to provide a packet transfer apparatus capable of preventing the packet processing and network resources from being wastefully performed and run in the communication system using PPPoE.

As means for solving the above problem, the packet transfer apparatus has an ability provided to set therein the information from which the apparatus can judge whether a response packet to a predetermined packet received from a terminal is transmitted back to the terminal, so that the response packet transmission can be controlled on the basis of this information set in the apparatus. In addition, the operator of the communication system, networks or packet transfer apparatus properly sets this information in each of a plurality of packet transfer apparatuses provided within the communication system. Thus, the packet transfer apparatus is able to surely transfer packets between the terminals and the communication facilities of the communication service providers and prevent the packet processing and network resources from being wastefully performed and run.

In other words, the packet transfer apparatus connects a first communication network that holds the ends of a plurality of terminals to a plurality of second communication networks that hold the ends of servers for offering communication services so as to transfer packets between the terminals and the servers. This packet transfer apparatus has a plurality of channel interfaces for transmitting and receiving the packets to and from the first and second communication networks, a protocol processor that converts the format of the packets received through the channel interfaces, transfers the packets through the channel interfaces and performs other communication processes, and a controller for controlling the whole packet transfer apparatus. The information that indicates to respond or not to a predetermined packet received from the first network is previously set in the protocol processor. The protocol processor decides to process or discard the packet on the basis of the set information when it receives the predetermined packet. If the processor decides to process, it continues the communication procedure that follows the reception of the predetermined packet to establish the connection between the terminal and the server through the first and second communication networks so that the packets can be transferred. If the processor decides to discard, it discards the predetermined packet, and ends the communication procedure.

Here, the specific communication procedure is the PPPoE communication procedure defined by RFC2516 of IETF. After a PPP session is established in the first communication network, or between the terminals and the packet transfer apparatus so that the packet from the terminal can be transferred to the packet transfer apparatus by this session, a certain communication process is performed so that the packet can be transferred to the server through any one of the plurality of the second communication networks. The predetermined packet mentioned above is a PADI packet. When the communication procedure is continued, a PADO packet is transmitted back to the terminal. When the PADI packet does not have any identifier specified in association with a communication service offered by the server, or when the PADI packet has an identifier specified but not matched to the identifier previously set as the information, the PADI packet is discarded.

In addition, the packet transfer apparatus has an ability provided to set therein a correspondence between the identifiers of the terminals and the communication services that can be offered, and the PPP session establishment control including the transmission control of the response packet is made on the basis of this setting. In other words, as the information to be previously set in the packet transfer apparatus, there are provided a correspondence table of the address identifiers of the terminals and the identifiers associated with the communication services that can be offered to the terminals, and another correspondence table of the identifiers associated with the communication services and the PPP session identifiers that the packet transfer apparatus can offer. Thus, the apparatus decides to transmit the PADS packet to the terminal or discard the PADR packet on the basis of the address of the terminal contained in the PADR packet and the previously set information.

According to the invention, it is possible to provide the packet transfer apparatus capable of connecting the terminal to the communication network desired by the terminal in the communication system for making communications by using PPPoE.

Other objects, features and advantages of the invention will become apparent from the following description of the embodiments of the invention taken in conjunction with the accompanying drawings.

BRIEF DESCRIPTION OF THE DRAWINGS

FIG. 4 is a diagram useful for explaining an example of the status of mode judgment of the packet transfer apparatus.

FIG. 5 is a diagram useful for explaining an example of the status of Service-Name judgment of the packet transfer apparatus.

FIG. 7 is a diagram useful for explaining an example of the status of a session ID management table of the packet transfer apparatus.

FIG. 11 is a diagram useful for explaining an example of the status of a connection management table of the packet transfer apparatus.

FIG. 12 is a diagram useful for explaining an example of the status of a session ID allocation table of the apparatus.

FIG. 15 is a flowchart of still another example (2) of the operation of the packet transfer apparatus.

FIG. 16 is a flowchart of further example (3) of the operation of the packet transfer apparatus.

DESCRIPTION OF THE EMBODIMENTS

The construction and operation of a packet transfer apparatus according to the invention will be described with reference to the drawings.

Figure 1:
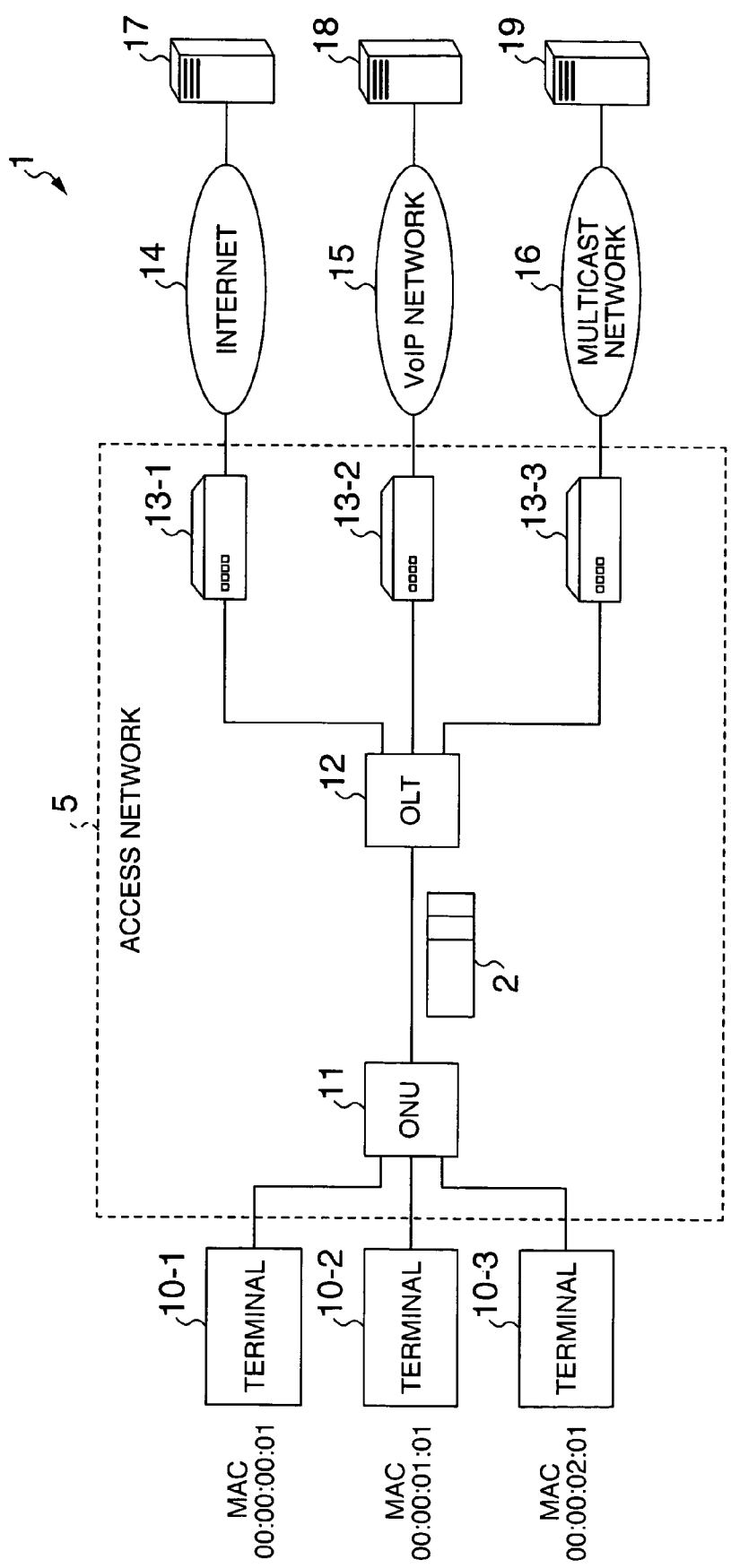
FIG. 1 is a diagram showing an example of the construction of a communication system using packet transfer apparatuses.

FIG. 1 is a diagram showing an example of the construction of a communication system using the packet transfer apparatuses according to the invention.

A communication system 1 has a plurality of terminals 10-$i$ ($i$=1, 2, 3), an access network 5 that includes an ONU (Optical Network Unit) 11 that holds the ends of these terminals, an OLT (Optical Line Terminal) 12 connected to this ONU 11 and packet transfer apparatuses 13-$i$ ($i$=1, 2, 3) connected to the OLT 12, and a plurality of communication networks of the Internet 14, VoIP network 15 and multicast network 16 that are respectively connected to the packet transfer apparatuses 13-$i$ ($i$=1, 2, 3) to offer various communication services, and servers of Web server 17, SIP (Session Initiation Protocol) server 18 and Video server 19 that are respectively connected to these networks to offer various communication services.

An arbitrary one 10-$i$ of the terminals of the communication system 1 establishes a PPP session in the access network 5 and communicates with an arbitrary packet transfer apparatus 13-$i$. Specifically, a PPPoE packet 2 containing an IP packet from the terminal is transmitted through the ONU 11 and OLT 12 of the access network 5 to a desired packet transfer apparatus 13-$i$. The packet transfer apparatus 13-$i$ receives the PPPoE packet (frame) 2, and then transfers the IP packet from the terminal to the server (in this example, any one of the Web sever 17, SIP server 18 and Video server 19) through the connected communication network (in this example, any one of the Internet 14, VoIP network 15 and multicast network 16) so that it can offer the communication service desired by the terminal. Although the flow of signal from the terminal to the server is described above, the procedure opposite to the above flow is also performed so that the IP packet can be sent for the communication service to be offered. In addition, although a pair of ONU and OLT of the access network is shown as an example, a plurality of pairs of ONU and OLT may be employed. The construction and operation of the communication system 1 and packet transfer apparatus 13 will be later described in detail with reference to the following diagrams.

Figure 2:
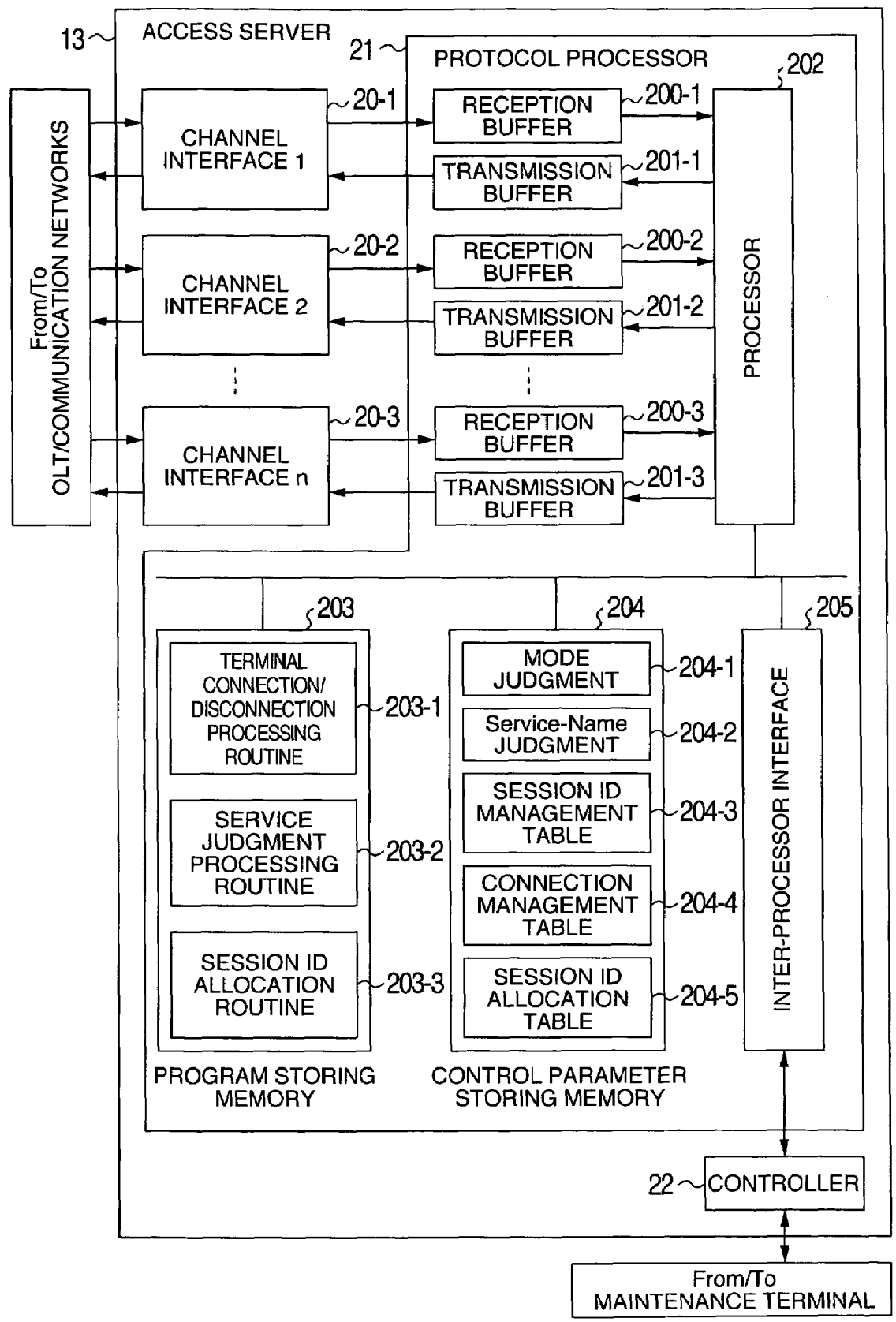
FIG. 2 is a block diagram showing an example of the construction of the packet transfer apparatus.

FIG. 2 is a block diagram showing an example of the construction of the packet transfer apparatus according to the invention.

The packet transfer apparatus 13 has a plurality of channel interfaces 20-$i$ ($i$=1, 2, . . . ) for connecting the OLT 12 and the communication networks 14, 15, 16, one or more protocol processors 21 that are connected to the plurality of channel interfaces, and a controller 22 that is connected through an inter-processor interface 205 to the protocol processor 21 so as to control the whole packet transfer apparatus 13. The controller 22 has a signal input/output interface (not shown) provided to the external apparatus such as a maintenance terminal so as to set control parameters necessary for the operation of packet transfer apparatus 13 and to report the operation status to the outside. The connection ends of the OLT and the various communication networks to the channel interfaces are properly installed by the operator of the packet transfer apparatus or access network so that the information of which channel interface can be connected to either one of the communication networks can be stored in the packet transfer apparatus.

The protocol processor 21 has reception buffers 200-$i$ ($i$=1, 2, . . . ) for receiving the packet from the channel interfaces 20, transmission buffers 201-$i$ ($i$=1, 2, . . . ) for transmitting the packet to the channel interfaces 20, a processor 202, and a program-storing memory 203 that stores various programs (a terminal connection/disconnection processing routine) 203-1, a Service-Name judgment processing routine 203-2, and a session ID allocation routine 203-3). This protocol processor 21 further has a control parameter-storing memory 204 that stores various control parameters (a mode judgment 204-1, a Service-Name judgment 204-2, a session ID management table 204-3, a connection management table 204-4 and a session ID allocation table 205-5), and the inter-processor interface 205 connected to the controller 22. The information about the ends-holding capability of the channel interfaces is stored in any one of the inner regions (the Service-Name judgment region 204-2 in the example mentioned later) of the memory 204. In addition, the connection management table 204-4 and session ID allocation table 204-5 are set (or may not be set) according to the formation of communication networks when the packet transfer apparatus is connected to a plurality of communication networks for offering communication services.

Figure 3:
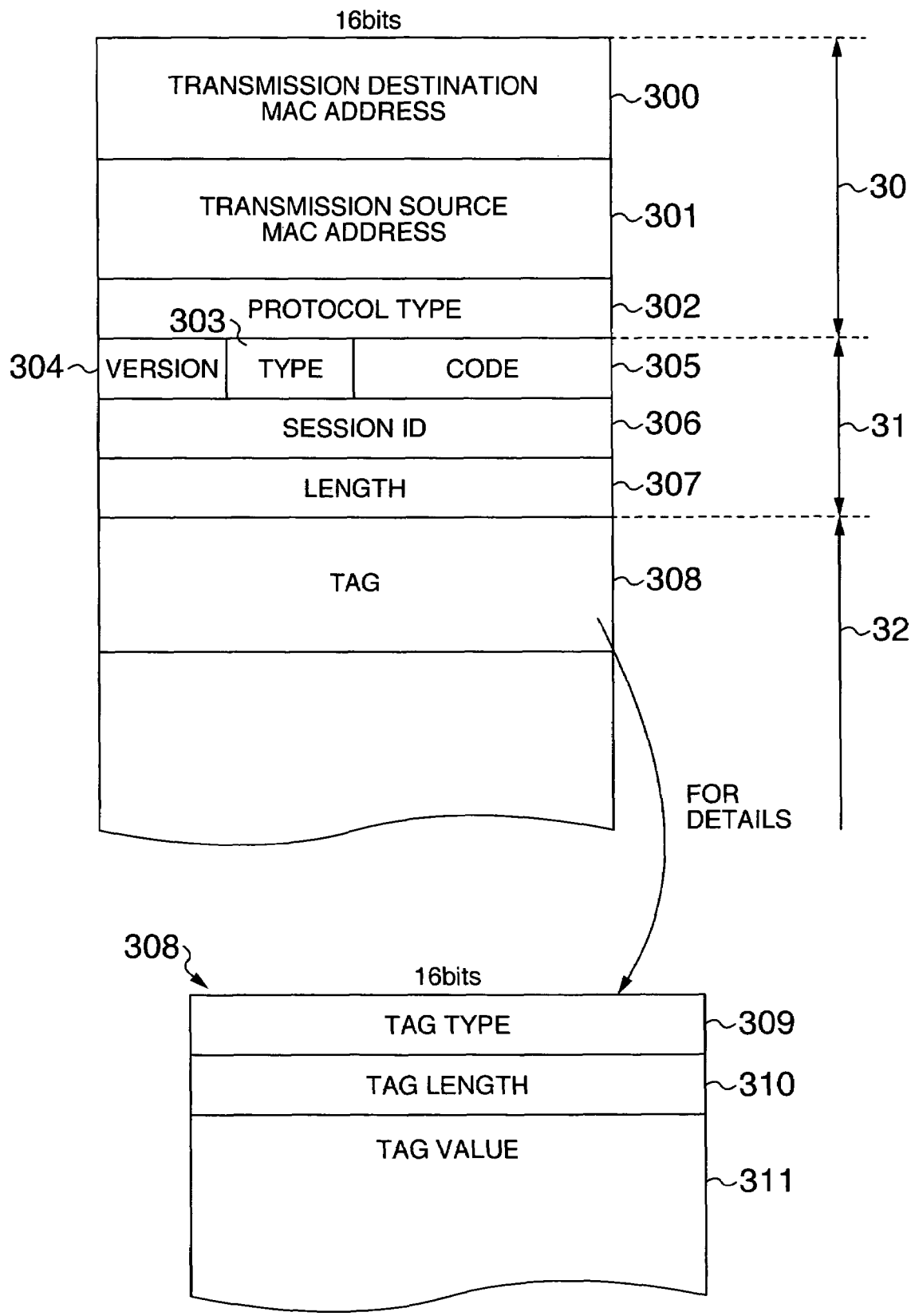
FIG. 3 is a diagram showing an example of the format of the PPPoE packet.

FIG. 3 shows an example of the format of the PPPoE packet.

The PPPoE packet has the PPP packet encapsulated by the PPPoE header in order that the PPP packet containing the IP packet can be transferred by using the PPP (Point-to-Point Protocol) session on the Ethernet (a registered trademark). Thus, the PPP packet can be treated as the packet of Ethernet. The PPPoE packet is comprised of an Ethernet header 30, a PPPoE header 31 and a variable-length payload 32 that constitutes the PPP packet.

The Ethernet header 30 is formed of areas of a transmission destination MAC address (the MAC address of packet transfer apparatus 13 that is responsive to the PADI packet which will be described later) 300, a transmission source MAC address (the MAC address of the terminal that is used when the session ID is allocated as will be mentioned later) 301, and a protocol type 302. The PPPoE header 31 is formed of areas 303-307 of a version (PPPoE version field: set for 0x1), a type (type field: set for 0x1), a code (an identifier for identifying a packet of PADI, PADO, PADR and PADS), a session ID (an identifier for PPPoE session) and a length (the payload length of PPPoE).

The payload 32 has a TAG 308 that contains areas 309-311 of a TAG type, TAG length and a TAG VALUE. Specifically, the TAG type 309 is used for setting the type of TAG VALUE 311. When the Service-Name is used for specifying a desired communication service, 0x0101 is set in the area of TAG type 309, the length of the Service-Name in the area of TAG length 310, and the Service-Name in the area of TAG VALUE 311. In other words, when the terminal desires to receive a certain communication service (for example, IP phone service using VoIP network), the packet transfer apparatus produces a packet with 0x0101 set in the area of TAG type 309, an identifier indicative of the service using VoIP network set in the area of TAG VALUE 311 and the length set in the area of TAG length 310, thus establishing the PPP session. When nothing is set in the TAG VALUE 311, TAG length is regarded as 0 as described above.

FIG. 4 is a diagram useful for explaining the status of the mode judgment area 204-1 to be set in the memory 204 of the packet transfer apparatus 13.

This mode judgment area 204-1 has previously set therein the information of if the packet transfer apparatus 13-$i$ responds to the terminal 10-$i$ when it receives the PADI packet with the Service-Name not specified (TAG length equals 0 or regarded as 0) from the terminal 10-$i$. By setting in this mode judgment area 204-1, the packet transfer apparatus 13 decides the operation to be made when receiving the PADI packet of which the TAG length is 0 with Service-Name not specified.

Each of the packet transfer apparatuses 13-*i* of the communication system 1 shown in FIG. 1 has its mode judgment area set as illustrated in FIG. 4. The packet transfer apparatus 13-1 is set to respond to the PADI packet of which the TAG length is 0, and the packet transfer apparatuses 13-2, 3 not to respond to the PADI packet of which the TAG length is 0. The operator of the packet transfer apparatus 13 or access network 5 properly sets the judgment areas according to the information of what communication services can be utilized from the networks that offer communication services so that the terminals 5 and the servers 17, 18, 19 can be prevented from being connected by mistake as described above. By setting these mode judgments, the packet transfer apparatuses 13 can eliminate the situation in which the PADO packet is unconditionally given back (responsive) when they receive the PADI packet with TAG length of 0. Therefore, the terminal can more accurately receive the PADO packet from the packet transfer apparatus that can be connected to the communication network for offering the desired communication service. Thus, the desired communication service can be surely offered.

FIG. 5 is a diagram useful for explaining the status of the Service-Name judgment area 204-2 set in the memory 204 of the packet transfer apparatus 13.

This Service-Name judgment area 204-2 has previously set therein the name of communication network for offering a communication service, namely the Internet 14, VoIP network 15 or multicast network 16 to which the packet transfer apparatus 13-*i* is connected. By setting the names of communication networks in this Service-Name judgment areas 204-2, the packet transfer apparatuses 13 can decide the operation after receiving the PADI packet and confirming the communication service (connection-destination communication network) requested from the terminal. Specifically, the packet transfer apparatus 13 uses this Service-Name judgment area 204-2 to compare the Service-Name of the received PADI packet to the previously set Service-Name. If it coincides therewith, the apparatus sends the PADO packet. If it does not coincide, the apparatus discards PADI packet and does not send the PADO packet.

Each packet transfer apparatus 13-*i* of the communication system 1 shown in FIG. 1 has the status of its Service-Name judgment area as illustrated in FIG. 5. In other words, the packet transfer apparatus 13-1 is connected to the Internet (Web), the packet transfer apparatus 13-2 to VoIP network, and the packet transfer apparatus 13-3 to multicast (Video) network. Although each packet transfer apparatus 13 has a single Service-Name set therein in this embodiment, it may have a plurality of Service-Names set therein as will be described later. The values set on the left sides of the Service-Name areas shown in FIG. 5 indicate the identifiers of the channel interfaces 20-*i* that connect the packet transfer apparatuses 13 to the communication networks 17, 18, 19. The operator of the packet transfer apparatus 13 or access network 5 similarly sets the status of the Service-Name judgment areas 204-2 according to the connection of communication services to the channel interfaces 20.

Figure 6:
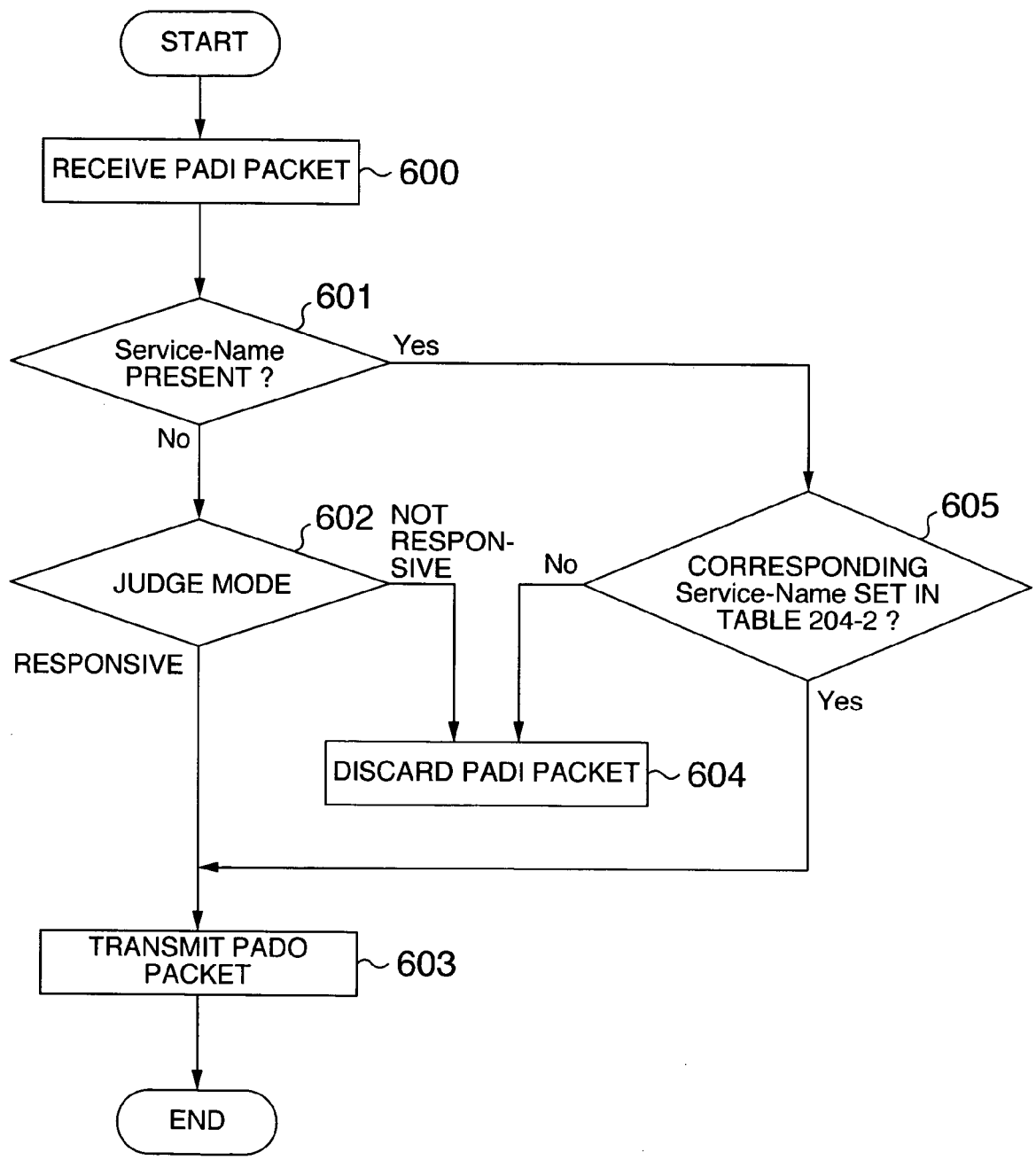
FIG. 6 is a flowchart of an example of the operation of the packet transfer apparatus.

FIG. 6 is a flowchart for an example of the operation of the packet transfer apparatus 13.

First, the channel interface 20 of the packet transfer apparatus 13 receives the PADI packet from the terminal 10 (step S600). This PADI packet is transmitted from the channel interface 20 to the reception buffer 200 of the protocol processor 21.

The processor 202 of the protocol processor 21 reads out from the PADI packet from the reception buffer 200 by using the terminal connection/disconnection processing routine 203-1 and Service judgment processing routine 203-2. Then, it judges the type of TAG VALUE 311 from the TAG type 309, and judges the presence or absence of the designated Service-Name from the TAG length 310 and TAG VALUE 311 (S601).

If there is no designated Service-Name, the processor 202 judges whether it responds to the transmission source terminal 10 of the PADI by referring to the mode judgment area 204-1 (S602). If the judgment is to respond to the transmission source terminal 10 of the PADI, the PADO packet is transmitted through the transmission buffer 201 to the corresponding terminal (S603). If the judgment is not to respond, the PADI packet is discarded (S604). Therefore, even if there is no designated Service-Name, the packet transfer apparatus 13 can control the PADO packet to be transmitted or not. Only the packet transfer apparatus in which the response capability is set can transmit the PADO packet to the terminal in response to the PADI packet with TAG length 310 of 0.

If a Service-Name is specified in the TAG VALUE 311 of PADI packet in step S601, the processor 202 judges whether the Service-Name is registered in the Service-Name judgment area 204-2 by referring to the Service-Name judgment area 204-2 (S605).

If the Service-Name contained in the PADI is registered in the Service-Name judgment area 204-2, the processor 202 sends the PADO packet to the corresponding terminal (S603). If it is not registered, the processor 202 discards the PADI packet (S604). In other words, if the Service-Name is designated in the PADI packet, the processor discards the PADI packet that contains other Service-Name than the designated Service-Name in the packet transfer apparatus 13. If there is the same as registered, the PADO packet is sent back to the terminal.

Although the details will be described later, if the packet transfer apparatus 13 receives the PADR packet from the terminal 10 after the process in step S603, it uses the terminal connection/disconnection processing routine 203-1 and session ID allocation routine 203-3 in order to establish the PPP session, thereby decides the session ID for use in the communication on the PPP session, and transmits back to the corresponding terminal the PADS packet that contains this session ID. Therefore, since the PPP session is established, it is possible that the packet transfer apparatus 13 is connected (transfers a packet) to the terminal 10 and to the communication network server 17, 18, 19. Specifically, the IP packet to be transmitted from the terminal 10 to the server 17, 18, 19 is encapsulated with the PPPoE packet. This encapsulated packet using the session ID for PPP session is transmitted to the packet transfer apparatus 13. In the packet transfer apparatus 13, the PPPoE packet received through the channel interface 20 is processed (decapsulated by deleting the Ethernet header) by the protocol processor 21 that is formed of the reception buffer 200, processor 202 and transmission buffer 201. The IP packet thus produced is transferred from the channel interface 20 to the server 17, 18, 19 through the connected communication network 14, 15, 16. The reverse signal flow is also made by the opposite procedure to that mentioned above.

FIG. 7 shows an example of the status of the session ID management table set in the memory 204 of packet transfer apparatus 13.

The session ID management table 204-3 has a column of session ID 700 of the identifiers for use in the communication by PPP session, a column of transmission source (terminals) MAC addresses 701 for the communication by PPP session, and a column of judgment bits 702 that indicate the used or unused state of session ID 700.

The session ID management table 204-3 has unique session ID 700 of which the number corresponds to that of sessions that the packet transfer apparatus can provide. When the processor 202 transmits the PADO packet to the terminal that desires to establish the PPP session, and then receives the PADR packet from the terminal, it uses the session allocation routine 203-3 to search the session ID 700 by referring to the judgment bits 702 of session ID table 204-3, and to allocate one of the free sessions ID to the corresponding terminal. The terminal is notified of this allocated session ID through the PADS packet. Thereafter, the terminal and the packet transfer apparatus communicate with each other (the communication of terminal-packet transfer apparatus-communication network-server) by the PPP session using this session ID. At this time, the processor 202 changes the judgment bit 702 corresponding to the new allocated session ID from the unused state of 0 to the used state of 1, and registers the MAC address 701 of the transmission source terminal using this session ID in the table.

With reference to FIGS. 1 through 7, the terminal 10-1 is communicating with the packet transfer apparatus 13-1 and communicating with the Web server 17 through the Internet 14 by using the session ID of 1. In addition, the terminal 10-2 is communicating with the packet transfer apparatus 13-2 and with the SIP server 18 through the VoIP network 15 by using the session ID of 2. Moreover, it is shown that the terminal 10-3 can have session ID of 3 allocatable (MAC address is enclosed within parentheses, and judgment bit is 0) from the packet transfer apparatus 13-3. If the session ID is allocated to the terminal 10-3 by the packet transfer apparatus 13-3, the parentheses of the MAC address corresponding to the session ID of 3 in FIG. 7 are removed (the MAC address is registered), and the judgment bit is also changed from 0 to 1. FIG. 7 shows a single table produced by combining all the respective session ID tables 204-3 of the packet transfer apparatuses 13-*i* (the plurality of packet transfer apparatuses 13-*i*).

Figure 8:
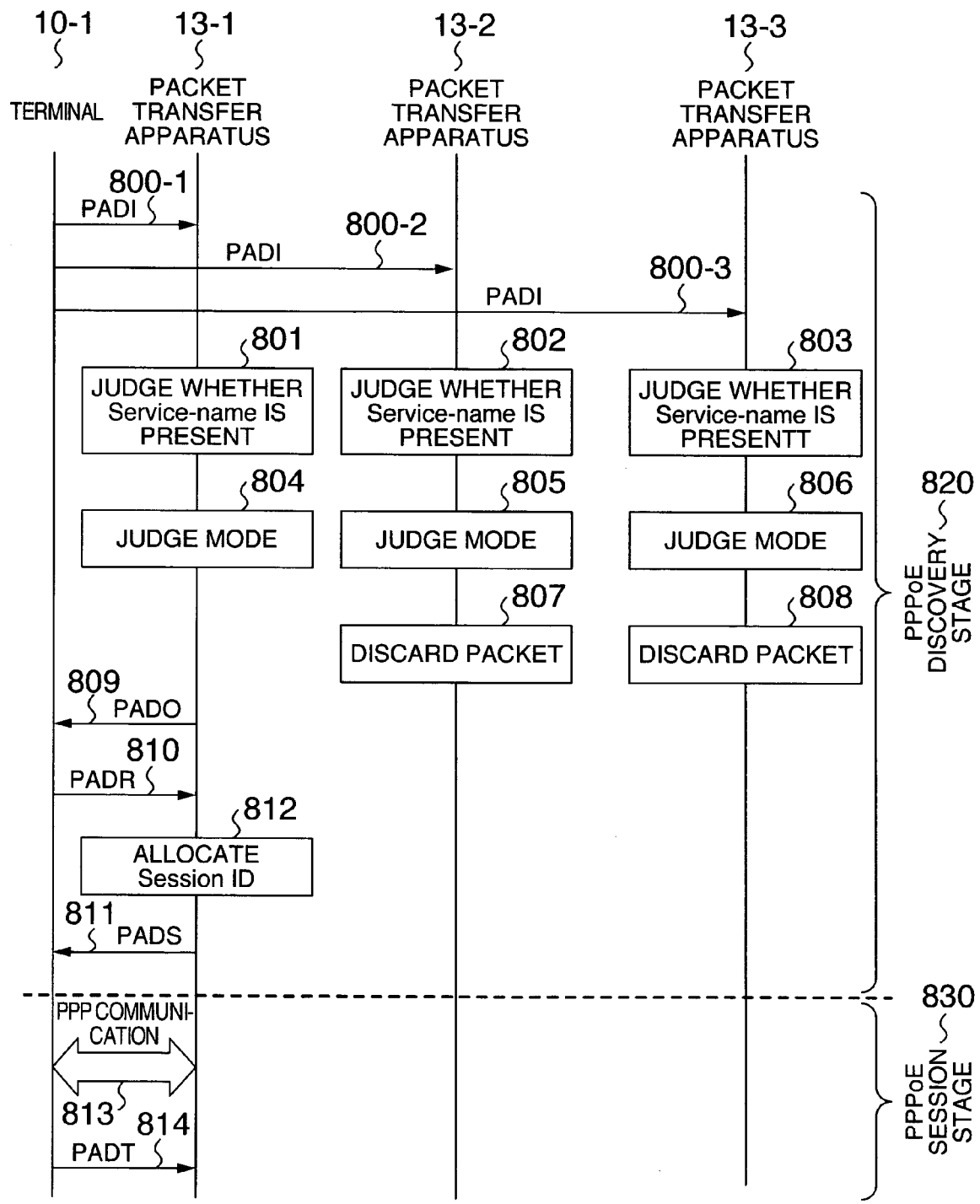
FIG. 8 is a diagram showing the sequence of an example of the operation of a communication system using the packet transfer apparatuses.

FIG. 8 shows an example of the sequence of the operation of the communication system using packet transfer apparatuses according to the invention. In this operation, any Service-Name is not designated in the PADI packet (TAG length=0). This communication system is shown in FIG. 1, and the mode judgment area 240-1 set in each packet transfer apparatus 13-*i* (i=1, 2, 3) is shown in FIG. 4. That is, only the packet transfer apparatus 13-1 connected to the Internet 14 responds to the PADI packet with no Service-Name specified, and the other packet transfer apparatuses 13-2, 13-3 discard the PADI packet. In this sequence, the component elements other than the terminal 10-*i* and packet transfer apparatus 13-*i* are omitted and the operations thereof will not be described.

In order to find the packet transfer apparatus 13 that could respond (establish the PPP session) and accept a desired service, the terminal 10-1 makes multicast transmission of PADI packet of TAG length=0 by using the PPPoE packet 2 within the access network 5, this PADI packet is received by each packet transfer apparatus 13-*i* (S800-1, S800-2, S800-3).

The processor 202 of each packet transfer apparatus 13-*i* judges whether a Service-Name is specified in the received PADI packet (S801, S802, S803). Here, since no Service-Name is designated in the PADI packet, the processor judges whether it responds to the terminal 10-1 by referring to the mode judgment area 204-1 set in the memory 204 (S804, S805, S806).

Since the packet transfer apparatuses 13-2, 13-3 set "NOT RESPONSIVE" in the mode judgment area 240-1 (see FIG. 4), the processor discards the received PADI packet (S807, S808) and does not respond to the terminal 10-1. In addition, since the packet transfer apparatus 13-1 sets "RESPONSIVE" in the mode judgment area 204-1 (see FIG. 4), the processor sends the PADO packet back to the terminal 10-1 (S809).

When the terminal 10-1 receives the PADO packet from the packet transfer apparatus 13-1, it transmits the PADR packet to the packet transfer apparatus 13-1 (S810). When receiving the PADR packet, the packet transfer apparatus 13-1 allocates a session ID by using the session ID allocation table 204-4 (S810, S812), and sends the PADS packet back to the terminal 10-1 (S811).

When the above operations are performed to complete a PPPoE discovery stage (820) and establish a PPP session, the PPP communication (S813) using the allocated session ID is performed in a PPPoE session stage (S830). The terminal 10-1 is thus connected to the Internet 14 through the ONU 11, OLT 12 and packet transfer apparatus 13-1. At the end of the PPP communication, the terminal 10-1 transmits a PADT packet (S814).

In the above example, since only the packet transfer apparatus 13-1 responds to the PADI packet of having no Service-Name and TAG length of 0, the IP packet from the terminal 10 is transferred to the Internet after the PPPoE discovery stage (820) is started by the PADI packet of TAG length of 0. In other words, since the maintenance operator properly sets the mode judgment area of each packet transfer apparatus, the control of distribution (connection) to the Internet can be accurately performed even if the terminal side forgets to set the Service-Name or sends the PADI packet of TAG length of 0. Thus, the terminal can be prevented from being connected to a destination communication network (VoIP network or multicast network) unintended by the maintenance operator and the terminal. Accordingly, since the PPPoE discovery stage process and PPPoE session stage process are not unnecessarily performed, the packet transfer apparatus can be improved in its processing ability, and the resources of the communication networks such as access network can be protected from unprofitable use.

Figure 9:
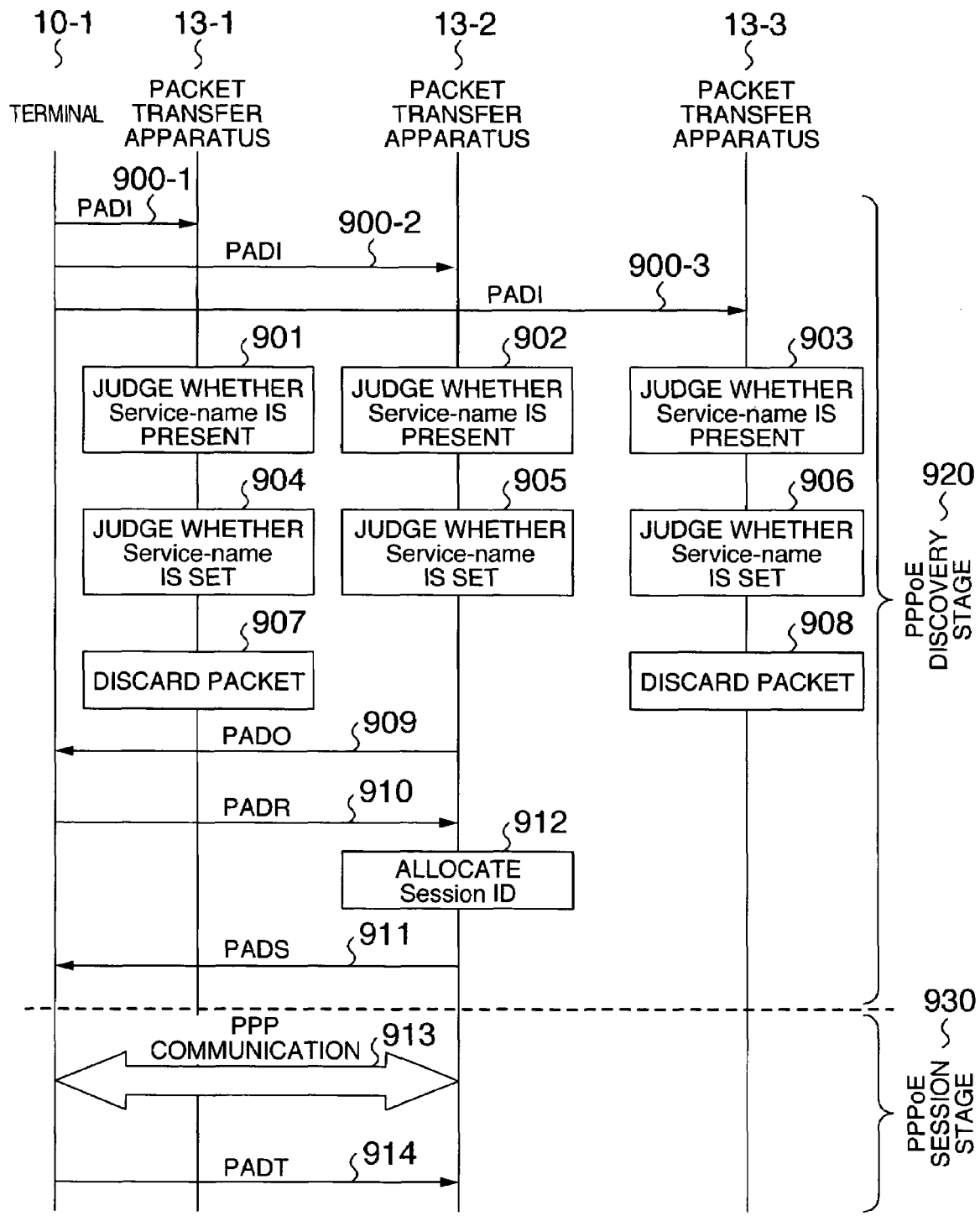
FIG. 9 is a diagram of the sequence showing another example of the operation of the communication system.

FIG. 9 shows another example of the sequence of the communication system using the packet transfer apparatuses. In this sequence, the PADI packet has a Service-Name specified. The communication system is shown in FIG. 1. The mode judgment area 204-1 and Service-Name judgment area 204-2 of each packet transfer apparatus 13-*i* (i=1,2,3) are set as shown in FIGS. 4 and 5. That is, only the packet transfer apparatus 13-1 that is connected to the Internet 14 responds to the PADI packet of which the Service-Name is not specified. The other packet transfer apparatuses 13-2, 13-3 discard the PADI packet of which the Service-Name is not specified. In addition, the Service-Name "Web" is set in the packet transfer apparatus 13-1, Service-Name "VoIP" in the packet transfer apparatus 13-2, and Service-Name "Video" in the packet transfer apparatus 13-3.

When the terminal 10-1 transmits the PADI packet in which "VoIP" is specified in the Service-Name, this PADI packet is received by each packet transfer apparatus 13-*i* (S900-1, S900-2, S900-3). Each packet transfer apparatus 13-*i* judges whether the received PADI packet has Service-Name specified (S901, S902, S903). Since the PADI packet has VoIP specified in Service-Name, each packet transfer apparatus 13-*i* does not make judgment about mode (S602 in FIG. 6, S804 through S806 in FIG. 8) as in the above example of operation, but judges whether this Service-Name is registered in the Service-Name judgment area 204-2 (S904, S905, S906).

Since the packet transfer apparatuses 13-1, 13-3 have "Web" and "Video" set in the Service-Name judgment areas 24-2, respectively (FIG. 5), the received PADI packets are discarded (S907, S908), and no answer is fed back to the terminal 10-1. On the other hand, the packet transfer apparatus 13-2 has "VoIP" set in the Service-Name judgment area 204-2 (FIG. 5), the PADO packet is sent back to the terminal 10-1 (S909).

When the terminal 10-1 receives the PADO packet from the packet transfer apparatus 13-2, it transmits the PADR packet to the packet transfer apparatus 13-2 (S910). Receiving the PADR packet, the packet transfer apparatus 13-2 allocates a session ID by using the session ID allocation table 204-4 (S910, S912), and sends the PADS packet back to the terminal 10-1 (S911).

When the above operations are performed to complete the PPPoE discovery stage 920 and establish the PPPoE session, the PPP communication (S913) using the allocated session ID is performed in the PPPoE session stage 930. The terminal 10-1 is connected to the VoIP network 15 through the ONU 11, OLT 12 and packet transfer apparatus 13-2 so that voice communication can be made by IP phone. At the end of the PPP communication, the terminal 10-1 transmits the PADT packet (S914).

Figure 10:
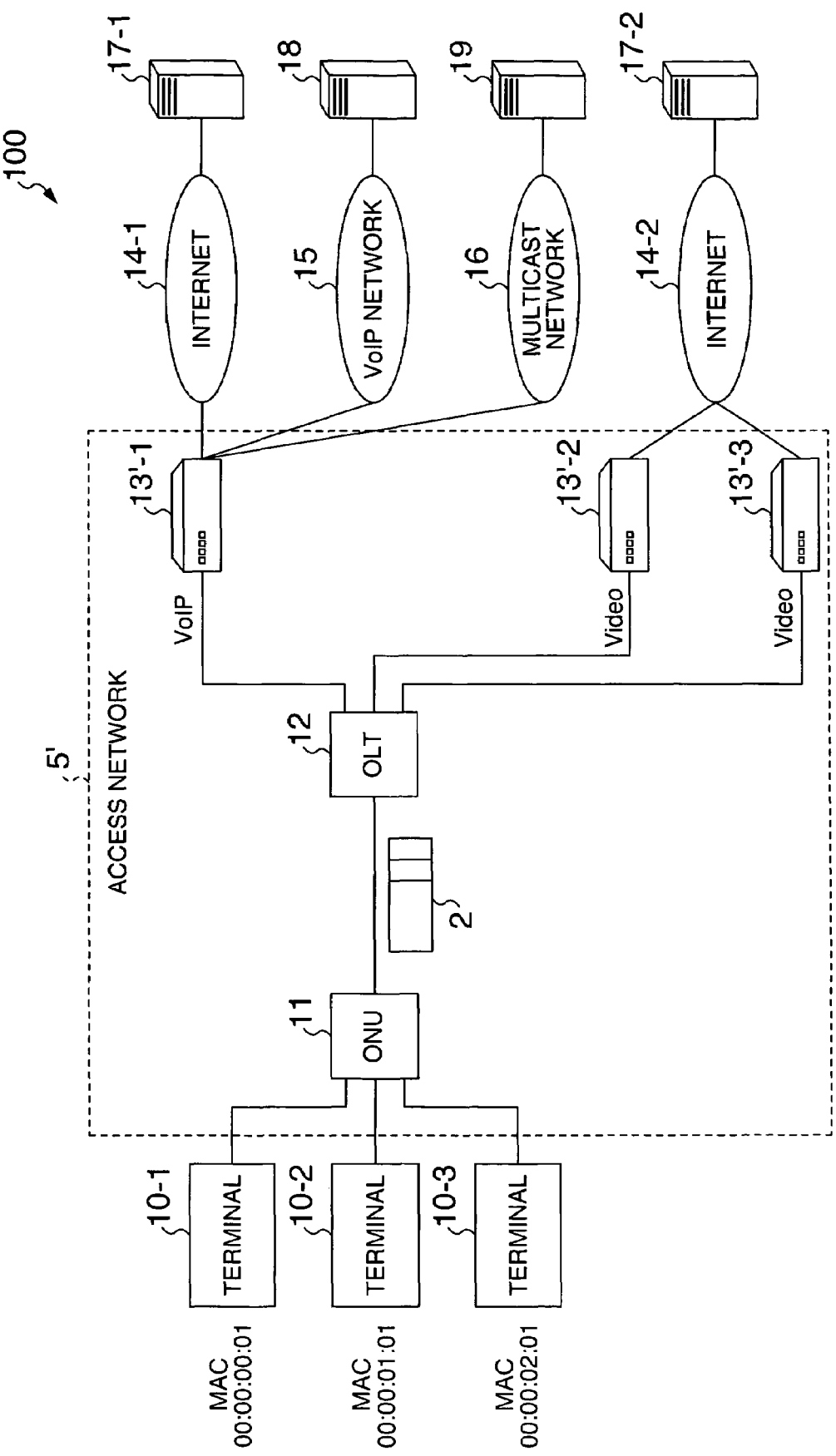
FIG. 10 is a diagram showing another example of the construction of the communication system using the packet transfer apparatuses.

FIG. 10 is a diagram showing another example of the construction of the communication system using the packet transfer apparatuses according to the invention. In this construction, one of the packet transfer apparatuses is connected to a plurality of communication networks for communication services.

A communication system 100 has a plurality of terminals 10-*i* (i=1, 2, 3), an access network 5' that includes the ONU (Optical Network Unit) 11 that holds the ends of the terminals, the OLT (Optical Line Terminal) 12 connected to this ONU 11 and packet transfer apparatuses 13'-*i* (i=1, 2, 3) connected to the OLT 12, and communication networks connected to the packet transfer apparatuses 13'-*i* (i=1, 2, 3), of Internet 14, VoIP network 15 and multicast network 16 for offering various communication services, and servers of Web server 17, SIP (Session Initiation Protocol) server 18 and Video server 19 connected to these communication networks for offering various communication services. The packet transfer apparatus 13'-1 is connected to the Internet 14-1, VoIP network 15 and multicast network 16. The packet transfer apparatuses 13'-2, 13'-3 are connected to the Internet 14-2.

In this communication system 100 as in the communication system 1 previously mentioned, a PPP session is established between an arbitrary terminal 10-*i* and the access network 5' in order to communicate with an arbitrary packet transfer apparatus 13-*i*. Thus, a communication service desired by the terminal can be offered by transferring the IP packet from the terminal through a connected communication network (in this example, any one of the Internet 14, VoIP network 15 and multicast network 16) to a server (in this example, any one of Web server 17, SIP server 18 and Video server 19). Although the details will be described later, the packet transfer apparatus 13'-*i* according to the invention has the connection management table 204-4 and session ID allocation table 204-5. This apparatus judges the connection-destination communication network to which the terminal 10-*i* is to be connected, by using the MAC address contained in the packet received from the terminal 10-*i* at the time of PPPoE communication, the session ID management table 204'-3, connection management table 204-4 and session ID allocation table 204-5. Thus, it causes the terminal 10-*i* to be connected to the corresponding communication network.

FIG. 11 shows an example of the connection management table 204-4 set in the memory 204 of the packet transfer apparatus 13. This connection management table 204-4 provided within the packet transfer apparatus 13 shows a correspondence table previously set between the MAC address 1100 of the terminal (transmission source) and the type of communication network (connectable) desired by the terminal. The operator of the access network or packet transfer apparatus sets this correspondence table. Thus, the packet transfer apparatus 13 is able to easily search for the communication network to be connected to each terminal, and specifies it.

From this connection management table 204-4 provided within the packet transfer apparatus 13'-1 as illustrated in FIG. 11, it will be seen that the terminal 10-1 can be connected to the Internet 14-1 when the MAC address is 00:00:00:01. Similarly, the terminal 10-2 can be connected to the VoIP network 15 when the MAC address is 00:00:01:01, and the terminal 10-3 can be connected to the multicast network 16 when the MAC address is 00:00:02:01.

FIG. 12 shows an example of the session ID allocation table 204-5 set in the memory 204 of the packet transfer apparatus 13. This session ID allocation table 204-5 has a column of groups of unique sessions ID corresponding to the number of sessions that can be provided by the packet transfer apparatus, and a column of communication networks that are connectable to each group, or that show the communication networks allocatable to each group of session ID. The operator of the access network or packet transfer apparatus sets the correspondence table between the session ID pool, 1200 formed of a plurality of groups of sessions ID and the destination communication networks, 1201 to be connected. Thus, the packet transfer apparatus can surely allocate a unique session ID to each communication service desired by the terminal, and accurately connect the terminal and the communication network.

From the example of the session ID allocation table 204-5 provided within the packet transfer apparatus 13'-1 as illustrated, it will be seen that the Internet 14-1 is used for the session group of session ID from 1 to 100, the VoIP 15 network for the session group of session ID from 101 to 200, and the multicast network 16 for the session group of session ID from 201 to 300. The packet transfer apparatus 13 that has received the PADR packet from the terminal obtains information of a destination communication network 1101 by using the transmission source MAC address of PADR packet and the connection management table 204-4. Thus, the packet transfer apparatus 13 grasps information (session ID pool 1200) of the usable session ID from the session ID allocation table 204-5, and then starts to perform the PPPoE discovery stage to establish the PPP session while it is creating the session ID management table 204'-3 as in the above example of operation.

Figure 13:
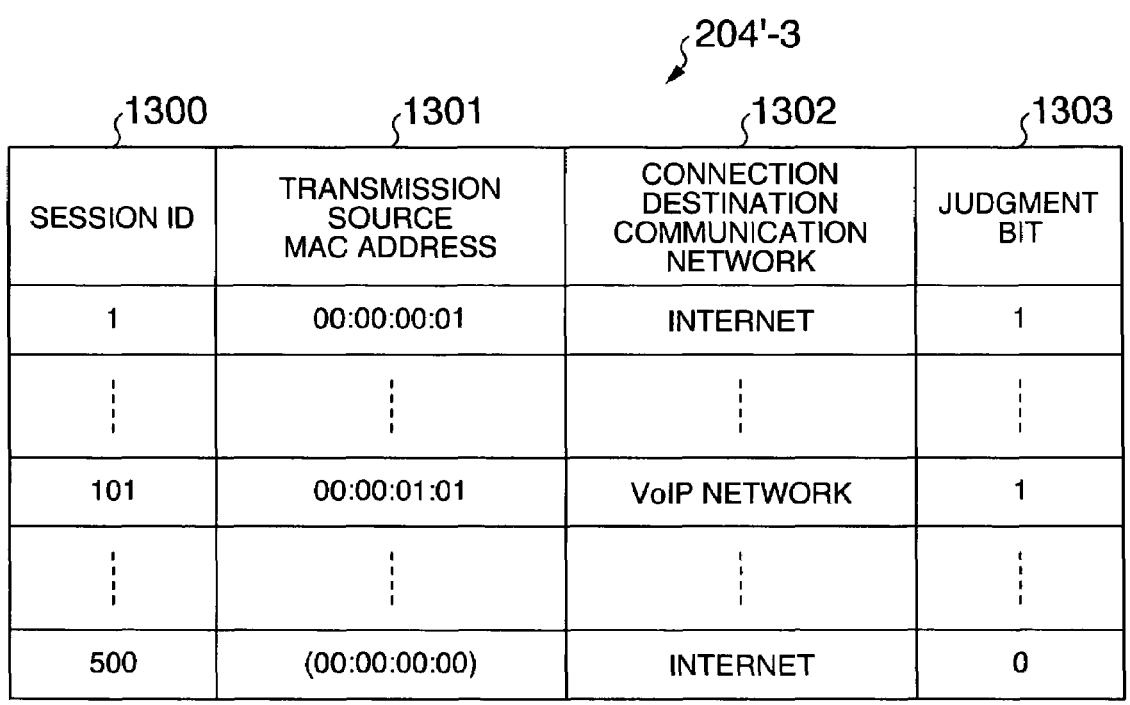
FIG. 13 is a diagram useful for explaining another example of the status of the session ID allocation table.

FIG. 13 shows another example of the session ID management table set in the memory 204 of the packet transfer apparatus 13.

This session ID management table 204'-3 is the addition of information of destination communication networks 1302 to session ID management table 204-3 set in the packet transfer apparatus 13 of the previous communication system 1. That is, the session ID management table has a column of session ID 1300 as identifiers used for the communication by PPP session, a column of MAC address 1301 of the transmission source (terminal) for the communication by PPP session, and a column of information of destination communication networks 1302, and a column of judgment bits 1303 showing the used or unused state of session ID 1300.

Even in this session ID table 2004'-3, is provided the unique session ID 1300 corresponding to the number of sessions that can be provided by the packet transfer apparatus. When the processor 202 transmits the PADO packet to the terminal 10 that desires to establish PPP session and then receives the PADR packet from the terminal, the processor 202 executes the session ID allocation routine 203-3 to grasp the information (session ID pool 1200) of usable session ID from the connection management table 204-4 and session ID allocation table 204-5. Thereafter, it confirms the judgment bits 1303 of the plurality of sessions ID pooled, and allocates one of the free sessions ID 1300 to the terminal. The terminal is notified of this allocated session ID through the PADS packet, and then the terminal is communicated with the packet transfer apparatus by PPP session using this session ID (the communication of the terminal to the packet transfer apparatus, to the communication network and to the server). The processor 202 changes the judgment bit 1303 corresponding to the newly allocated session ID from the unused state of 0 to the used state of 1, and registers the MAC address 1301 of the transmission source terminal using this session ID.

Referring to FIG. 10 through 13, the terminal 10-1 is communicating with the packet transfer apparatus 13'-1 by using session ID of 1 and with the Web server 17-1 through the Internet 14-1. The terminal 10-2 is also communicating with the packet transfer apparatus 13'-1 by session ID of 101 and with the SIP server 18 through the VoIP network 15. The terminal 10-3 can be connected (the MAC address is enclosed within parentheses and judgment bit is 0) to the Internet 14-1 or 14-2 when any one of the packet transfer apparatuses 13'-i allocates a session ID of 500 to that terminal. Even in FIG. 13, the session ID management tables 204'-3 set in the plurality of packet transfer apparatuses 13-i are combined into one table.

Figure 14:
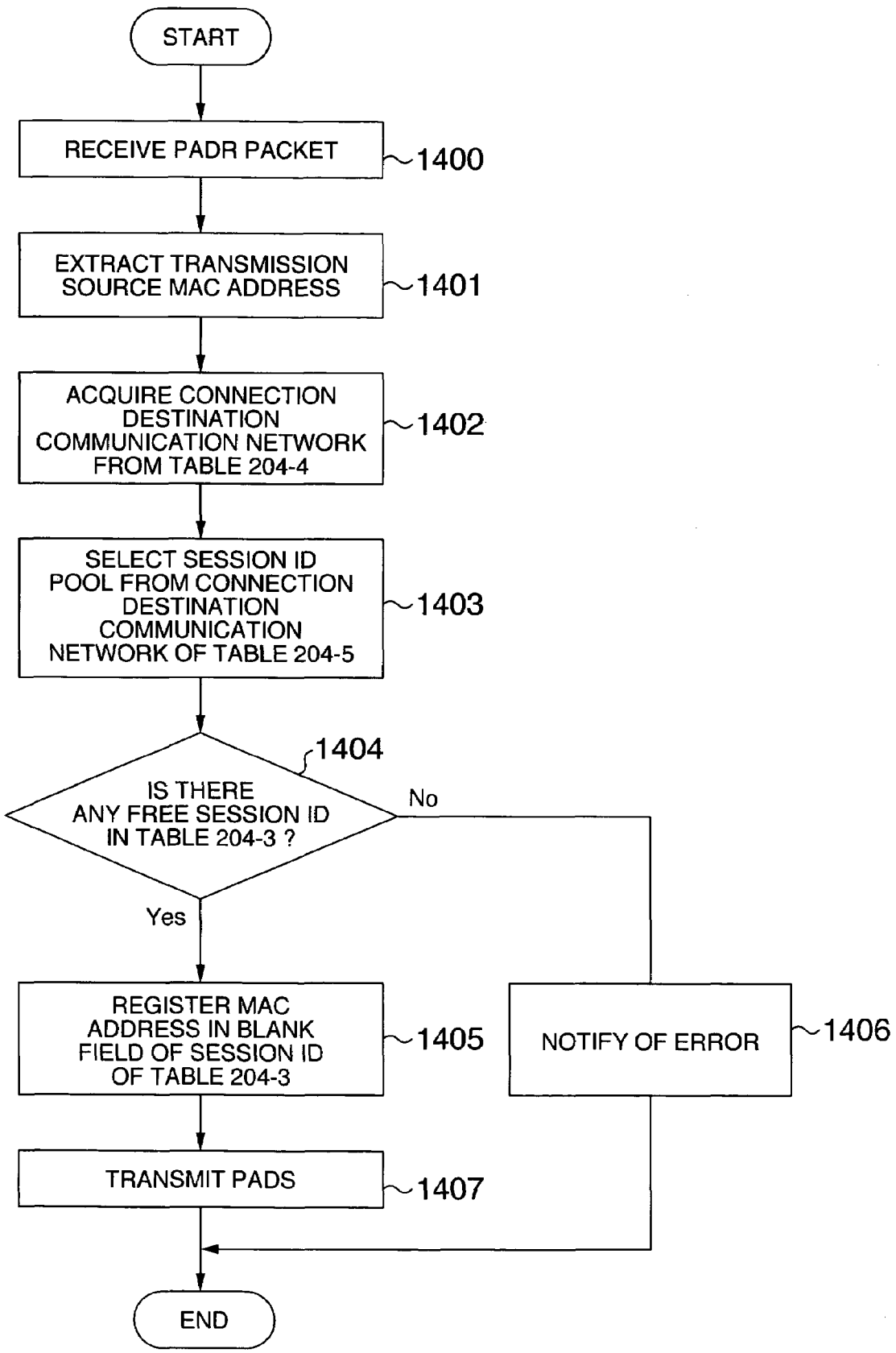
FIG. 14 is a flowchart of another example (1) of the operation of the packet transfer apparatus.

FIG. 14 is a flowchart of another example (example 1) of the operation of the packet transfer apparatus 13. In the flowchart shown in FIG. 14, the operation from the reception of PADI packet to the transmission of PADO packet is the same as in the operation shown by the flowchart of FIG. 6 and thus it is omitted. The operations following the transmission of PADO packet are described in detail in the flowchart of FIG. 14. That is, when the apparatus receives the PADI packet (no Service-Name is specified) of which TAG length is 0, the judgment about the transmission of PADO packet is performed according to the mode status 204-1 shown in FIG. 4 as in the previous embodiment. In addition, in the confirmation (S605) of Service-Name, the connection management table 204-4 shown in FIG. 11 may be used in place of the Service-Name judgment 204-2.

The channel interface 20 of packet transfer apparatus 13 that has transmitted PADO packet to the terminal 10 receives PADR packet from that terminal 10 (S1400), and transfers this PADR packet to the reception buffer 200 of the protocol processor 21.

The processor 202 of the protocol processor 21 uses the terminal connection/disconnection processing routine 203-1 and session ID allocation routine 203-3 to read out PADR packet from the reception buffer 200, acquires the MAC address of the transmission source terminal 10 (S1401), and judges about the destination communication networks from the MAC address of the transmission source terminal 10-i of RADR packet by referring to the connection management table 204-4 (S1402).

Then, the processor 202 refers to the session ID allocation table 204-5 to select the session ID pool from the destination communication network judged in step S1402 (S1403). The processor refers to the session ID management table 204-3 with respect to this selected session ID pool, and judges whether there is a free session ID from the judgment bit 1303 corresponding to the selected pool (S1404). If there is a free session ID after the sequential searching of the pool for free session ID, the MAC address of the transmission source terminal 10-i is registered in the column of free session ID of the session ID management table 204-3, the judgment bit (1303) is made 1, and the PADS packet is transmitted to the corresponding terminal (S1405, S1407). In addition, if there is no free session ID in the session ID management table 204-3 in step S1404, the processor 202 notifies this terminal of error (S1406).

The operation of communication system 100 shown in FIG. 10 will be described in detail. When the transmission source terminal is represented by 10-1, the MAC address of the terminal 10-1 is 00:00:00:01. By referring to the connection management table 204-4, it is possible to find that the destination communication network 1101 is set to be connected to the Internet. Since the destination communication network 1101 is set to be connected to the Internet as indicated in the connection management table 204-4, the processor refers to the session ID allocation table 204-5, and finds that the session ID pool 1200 corresponding to the destination communication network 1201 is "1 to 100". Therefore, the processor refers to the session ID management table 204'-3 to find a free session ID 1300 from the session ID group of "1 to 100" according to the judgment bit 1303. Since the session ID of "1" was free before the status shown in FIG. 13, the MAC address 00:00:00:01 of packet transfer apparatus 13-1 is registered in the session ID management table 204'-3, and the judgment bit is changed to 1 as illustrated. Thus, the session ID of "1" is allocated to the terminal 10-1. Similarly, the MAC address of the transmission source terminal 10-2 is 00:00:01:01, and the VoIP network is found to be set in the destination communication network 11-1 by referring to the connection management table 204-4 at this MAC address. Since the VoIP network is set in the connection management table 204-4, the session ID pool 1200 corresponding to the destination communication network 1201 is found to be "101 to 200" by referring to the session ID allocation table 204-5. Therefore, a free session ID 1300 is searched for from the session ID 1300 of "101 to 200" according to the judgment bit 1303. Since the session ID of "101" was free before the status shown in FIG. 13, the MAC address of 00:00:01:01 of packet transfer apparatus 13-2 is registered in the session ID management table 204'-3, and the judgment bit is changed to 1 as illustrated. Thus, the session ID of "101" can be allocated to the terminal 10-2.

The above operations are performed to complete the PPPoE discovery stage and to establish the PPP session, and thus the terminal 10 can be connected to the packet transfer apparatus 13, and the packet transfer apparatus 13 can be connected (packet transferred) through the communication network to the server 17, 18, 19.

FIG. 15 is a flowchart of another example (example 2) of the operation of the packet transfer apparatus 13, or a flowchart of the PPPoE session stage after the establishment of PPPoE session to the packet transfer apparatus.

The packet transfer apparatus 13-i receives a PPPoE session stage packet (hereinafter, called simply as PPPoE packet or packet) from the terminal (S1500), and acquires the MAC address and session ID of the transmission source terminal 10-i (S1501).

The processor 202 judges whether the MAC address of the packet transmission source terminal 10-i is registered in the session ID management table 204'-3 by referring to that table (S1502). If the MAC address is registered, the processor causes the terminal to be connected to the destination communication network set in the session ID management table 204'-3 (S1503). If the MAC address is judged not to be registered in step S1502, the processor discards the packet (S1504).

FIG. 16 is a flowchart of another example (example 3) of the operation of the packet transfer apparatus 13, or a flowchart of the operation for completing the PPP session.

When the packet transfer apparatus 13 receives (S1600) the PADT packet and acquires the MAC address and session ID of the transmission source terminal 10 (S1601), the processor 202 judges whether the MAC address of the packet transmission source terminal 10 is registered by referring to the session ID management table 204'-3 (S1602). In this step, if the MAC address of the PADT packet from the transmission source terminal 10 is registered, the registered information is deleted from the session ID management table 204'-3 (S1603), and the PPP session is released (disconnected). If the MAC address is not registered in the session ID management table 204'-3, this packet is discarded (S1604).

By using the packet transfer apparatuses that have the above construction and make the above operation, it can be prevented from occurring that, even when the packet transfer apparatus has a plurality of destination communication networks connected corresponding to the Service-Name specified by the PADI packet from the terminal, the terminal could not be connected to any one of a plurality of communication networks under only the Service-Name as in the conventional transfer apparatus. That is, before a connection request comes from the terminal, the rule for giving a session ID to the transmission source MAC address is previously defined, and thus a connection-destination communication network to be connected to the terminal can be allocated to the session ID corresponding to the connection request.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A packet transfer apparatus that connects a first communication network including a plurality of terminals and a plurality of second communication networks including servers for offering communication services so that packets can be transferred between said terminals and said servers, said packet transfer apparatus comprising:

a plurality of channel interfaces through which said packets are transmitted and received between said first and second communication networks;

a protocol processor to convert the format of said packets received through said channel interfaces and to make a process for the transfer of said packets between said channel interfaces and other processes for communication; and a controller for controlling said whole packet transfer apparatus, wherein mode a judgment table having information of ordering to respond or not to a certain one of said packets received from said first communication network is provided in said protocol processor through said controller, wherein said certain packet received from said terminals is processed or discarded on the basis of said information, such that when said certain packet is processed, said certain packet is transferred from said terminals to said servers after a communication procedure that follows the reception of said certain packet is continuously performed to connect said terminals and said servers through said first and second communication networks, while when said certain packet is discarded, said communication procedure is stopped from continuing after said certain packet is discarded, wherein said communication procedure is a PPPoE (Point to Point Protocol over Ethernet) communication procedure defined in RFC 2516 of IETE (Internet Engineering Task Force Request for Comments No. 2516), and makes a PPP (Point to Point Protocol) session be established between said terminals on said first communication network side and said packet transfer apparatus, wherein said certain packet is a PADI (PPPoE Active Discovery Initiation) packet, and when said communication procedure is continued, a PADO (PPPoE Active Discovery Offer) packet is transmitted back to said terminal, and wherein when said PADI packet from said terminals does not have a length of an identifier specified in association with a communication service offered by said server, said protocol processor decides to transmit said PADO packet back to said terminal or discard said PADI packet on the basis of said information provided in said mode judgment table of said protocol processor.

2. The packet transfer apparatus according to claim 1, wherein said packets from said terminals can be transferred to said packet transfer apparatus by said session, and then, after a predetermined communication process is performed, further transferred through one of said plurality of second communication networks to said servers.

3. The packet transfer apparatus according to claim 1, wherein when a length of an identifier associated with a communication service is not specified, which identifier is contained in said PADI packet from said terminals, is compared by said protocol processor with an identifier of said communication service that is contained in said information provided in said mode judgment table of said protocol processor and that is offered by said servers connected to said packet transfer apparatus so that said protocol processor can decide to transmit said PADO packet back to said terminals or to discard said PADI packet.

4. The packet transfer apparatus according to claim 1, wherein the length of the identifier in association with the communication service is a TAG length of Service-Name specifying said communication service.

5. A packet transfer apparatus that connects a first communication network including a plurality of terminals and a plurality of second communication networks including servers for offering communication services so that packets can be transferred between said terminals and said servers, said packet transfer apparatus comprising:

a plurality of channel interfaces through which said packets are transmitted and received between said first and second communication networks;

a protocol processor to convert the format of said packets received through said channel interfaces and to make a process for the transfer of said packets between said channel interfaces and other processes for communication; and a controller for controlling said whole packet transfer apparatus, wherein a mode judgment table having information of ordering to respond or not to certain first and second ones of said packets received from said first communication network is provided in said protocol processor through said controller, wherein said certain first packet received from said terminals is processed or discarded on a basis of said information, such that when said first packet is processed, a communication procedure that follows the reception of said first packet is continuously performed and followed by receiving said second packet, wherein said second packet received is processed or discarded on the basis of said information, such that when said second packet is processed, said second packet is transferred from said terminals to said servers after a communication procedure that follows the reception of said second packet is continuously performed to connect said terminals and said servers through said first and second communication networks, while when said second packet is discarded, said communication procedure is stopped from continuing after said certain second packet is discarded wherein said communication procedure is a PPPoE (Point to Point Protocol over Ethernet) communication procedure defined in RFC 2516 of IETF (Internet Engineering Task Force Request for Comments No. 2516), and makes a PPP (Point to Point Protocol) session be established between said terminals on said first communication network side and said packet transfer apparatus, wherein said first packet is a PADI (PPPoE Active Discovery Initiation) packet, to which said processor responds to transmit a PADO (PPPoE Active Discovery Offer) packet back to said terminals when said communication procedure is continued, and wherein said protocol processor decides to transmit said PADO packet back to said terminal or discard said PADI packet on a basis of said information in said mode judgment table when said PADI packet from said terminals does not have a length of an identifier specified in association with a communication service offered by a server.

6. The packet transfer apparatus according to claim 5, wherein said packets from said terminals can be transferred to said packet transfer apparatus, and then, after a predetermined communication process is performed, further transferred through one of said plurality of second communication networks to said servers.

7. The packet transfer apparatus according to claim 5, wherein said second packet is a PADR (PPPoE Active Discovery Request) packet, to which said processor responds to transmit a PADS (PPPoE Active Discovery Session-Confirmation) packet back to said terminals when said communication procedure is continued.

8. The packet transfer apparatus according to claim 7, wherein said information makes address identifiers of said terminals be associated with the identifiers of said communication services that can be offered to said terminals and makes said identifiers of said communication services be associated with the identifiers of PPP sessions, and said protocol processor decides to transmit said PADS packet back to said terminals or discard said PADR packet on a basis of said terminal address contained in said PADR packet and said information.

9. The packet transfer apparatus according to claim 5, wherein when a length of an identifier in association with a communication service is not specified, which identifier is contained in said PADI packet from said terminals is compared by said protocol processor with the identifiers of said communication services that are contained in said information and that are offered by said servers connected to said packet transfer apparatus so that said protocol processor can decide to transmit said PADO packet back to said terminals or discard said PADI packet.

10. The packet transfer apparatus according to claim 5, wherein the length of the identifier in association with the communication service is a TAG length of Service-Name specifying said communication service.

* * * * *